(12) United States Patent
Ranner et al.

(10) Patent No.: US 7,464,401 B2
(45) Date of Patent: Dec. 9, 2008

(54) SECURE WEB ACCESS VIA AN ORIGINAL CD

(75) Inventors: Gerfried Ranner, Freilassing (DE); Reinhard Blaukovitsch, Elixhausen (AT); Michael Kurz, Bad Dürrnberg (AT)

(73) Assignee: Sony DADC Austria AG, Anif (AT)

( * ) Notice: Subject to any disclaimer, the term of this patent is extended or adjusted under 35 U.S.C. 154(b) by 202 days.

(21) Appl. No.: 10/542,500

(22) PCT Filed: Jan. 16, 2004

(86) PCT No.: PCT/EP2004/000316

§ 371 (c)(1),
(2), (4) Date: Jul. 15, 2005

(87) PCT Pub. No.: WO2004/066126

PCT Pub. Date: Aug. 5, 2004

(65) Prior Publication Data

US 2006/0053482 A1   Mar. 9, 2006

(30) Foreign Application Priority Data

Jan. 17, 2003   (EP) .................................. 03001030

(51) Int. Cl.
G06F 7/04 (2006.01)
G06F 11/30 (2006.01)
H04L 9/32 (2006.01)
H04L 9/00 (2006.01)

(52) U.S. Cl. .................. 726/4; 726/5; 726/6; 726/7; 726/27; 726/28; 726/29; 726/30; 713/151; 713/152; 713/153; 713/154; 308/201; 308/202; 308/256; 308/257; 308/258

(58) Field of Classification Search .................. 726/4
See application file for complete search history.

(56) References Cited

U.S. PATENT DOCUMENTS

| | | | |
|---|---|---|---|
| 6,587,883 B1 * | 7/2003 | Rajakarunanayake | 709/227 |
| 6,802,000 B1 * | 10/2004 | Greene et al. | 713/168 |
| 6,959,420 B1 * | 10/2005 | Mitchell et al. | 715/745 |
| 6,959,860 B2 * | 11/2005 | Hendrick | 235/380 |
| 2004/0034767 A1 * | 2/2004 | Robinson et al. | 713/152 |

FOREIGN PATENT DOCUMENTS

| | | | |
|---|---|---|---|
| FR | 2 760 159 | | 8/1998 |
| FR | 2 822 255 | | 9/2000 |
| FR | 2822255 | * | 9/2002 |
| GB | EP 0 899 733 | | 3/1999 |
| GB | 2 346 239 | | 8/2000 |
| WO | WO 00/49505 | | 8/2000 |

* cited by examiner

*Primary Examiner*—Longbit Chai
(74) *Attorney, Agent, or Firm*—Oblon, Spivak, McClelland, Maier & Neustadt, P.C.

(57) ABSTRACT

A system for securing an access to a predetermined area of a target server uses a copy protected record carrier comprising an information file, which comprises a project identifier and/or an address of an authentification server with which an application using said information file can communicate so that the authentification server can initiate and confirm a connection between a computer on which said application is started and said predetermined area of said target server that is identified by the authentification server and/or the project identifier.

31 Claims, 3 Drawing Sheets

SECURE WEB ACCESS VIA AN ORIGINAL CD

Figure 1:
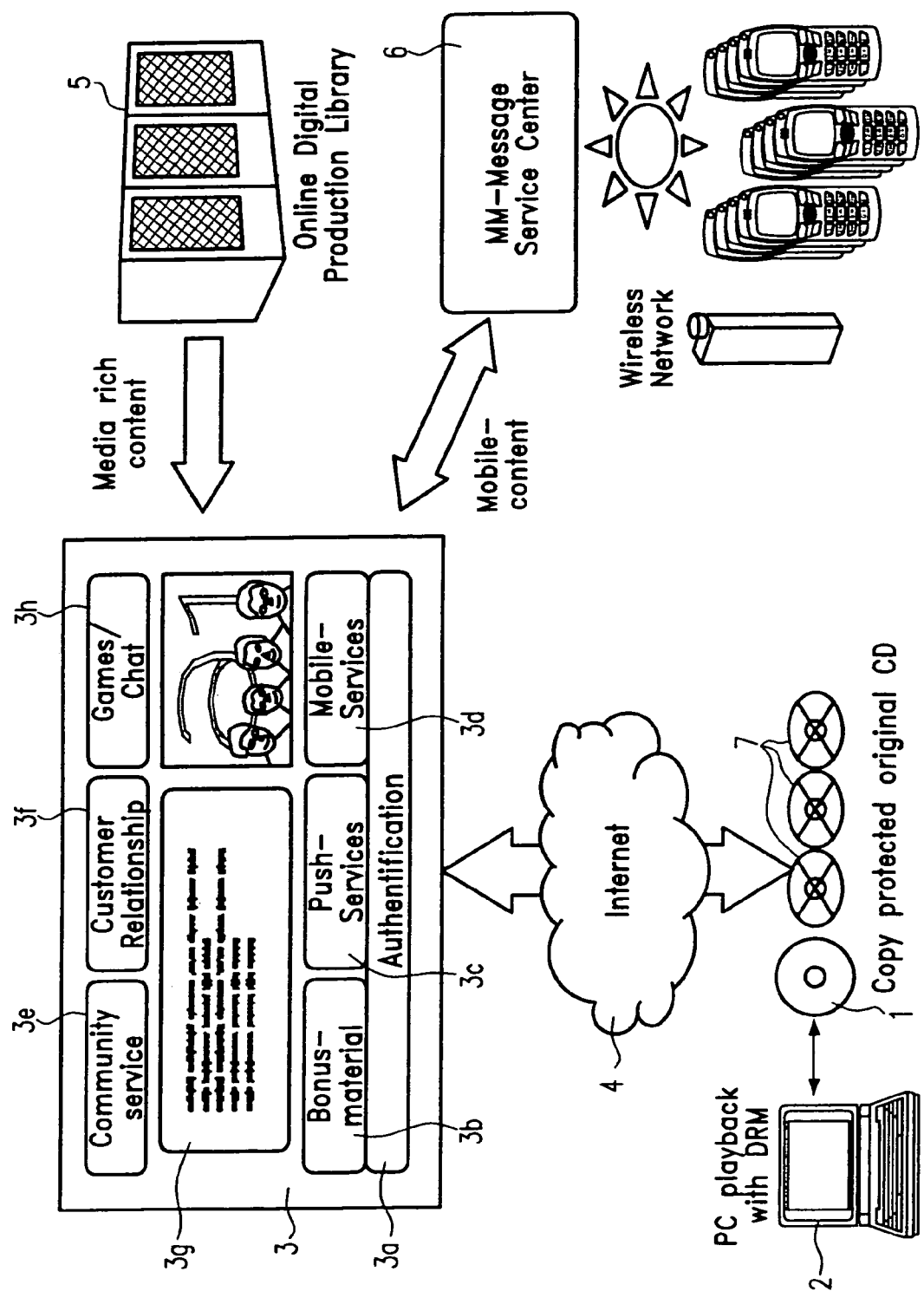

The present invention relates to a method for securing an access to a predetermined area of a target server, a method for starting a secure access to a predetermined area of a target server, and a record carrier.

To achieve a better position in the market and to better satisfy customers, today's CD and/or DVD labels, i.e. producers, want to offer added value and bonus material (in the following only referred to as bonus material) to a CD content and/or DVD content to the customers. A convenient way is to offer such services via the internet. However, such a system to offer bonus material must be secured to legitimate buyers of a respective record carrier, which might also include CD-ROMs or other current or future record carriers.

Therefore, currently secure internet connections that can be accessed with key-codes are offered to customers to access such bonus material. The key-codes are generally serialized e.g. on the data set and have to be entered during a login procedure on a login page to enter predetermined protected areas. The applicant's European patent application 02 003 465.8 "Method and Device for supplying of a Data Set stored in a Database", filed on Feb. 14, 2002, which content is herewith included into this application, describes such a system. The disadvantage of such a method is that the key-codes can be shared and the user experience/convenience suffers.

WO 00/49505 A1 discloses a system for automatic connection to a network wherein a smart card contains the information specific to the user and/or the ISP to be accessed. The information contained on the smart card gets automatically retrieved when it is inserted into a smart card reader of the system and the information is used to gain the wanted access without having the inconvenience of the user having to search for the correct information.

Therefore, it is the object underlying the present invention to provide an improved system to offer bonus material to a legitimate customer of a record carrier.

According to the present invention, this object is solved by a method for securing an access to a predetermined area of a target server, a method for starting a secure access to a predetermined area of a target server, and a record carrier. Preferred embodiments of the methods and record carrier according to the present invention are described. A computer program product and a computer readable storage means also are described.

The method for securing an access to a predetermined area of a target server according to the present invention comprises the step of providing an information file on a copy protected record carrier, which information file comprises a project identifier and/or an address of an authentification server with which an application using said information file can communicate so that the authentification server can initiate and confirm a connection between a computer on which said application is started and said predetermined area of said target server that is identified by the authentification server and/or the project identifier, wherein said authentification server verifies whether or not a changing parameter of the computer, in particular a randomly generated number and/or a computer system time transmitted from said computer, was not already previously used and initiates a connection of said computer with said predetermined area of said target server in case of a positive verification.

Further, the method for starting a secure access to a predetermined area of a target server according to the present invention comprises the step of accessing of an information file on a copy protected record carrier, which information file comprises a project identifier and/or an address of an authentification server with which an application using said information file can communicate so that the authentification server can initiate and confirm a connection between a computer on which said application is started and said predetermined area of said target server that is identified by the authentification server and/or the project identifier, wherein said authentification server verifies whether or not a changing parameter of the computer, in particular a randomly generated number and/or a company system time transmitted from said computer, was not already previously used and initiates a connection of said computer with said predetermined area of said target server in case of a positive verification.

Finally, the record carrier according to the present invention is copy protected and comprises an application and an information file, which information file comprises a project identifier and/or an address of an authentification server with which an application using said information file can communicate so that the authentification server can initiate and confirm a connection between a computer on which said application file is started and a predetermined area of a target server that is identified by the authentification server and/or the project identifier, wherein said application transmits a changing parameter of the computer, in particular a randomly generated number and/or a computer system time to said authentification server so that said authentification server can verify whether or not the changing parameter of the computer was not already previously used and can initiate a connection of said computer with said predetermined area of said target server in case of a positive verification.

Therefore, according to the present invention the record carrier, e.g. a compact or digital versatile disc with audio and/or video information, comprises an information file, e.g. in a second session, and is copy protected by a generally known or future copy protection, e.g. the today used SecuROM copy protection, as described in the applicants European Patent EP 0 899 733 B1, which content is herewith included by reference. This guarantees that an application that accesses this file, or the information file as said application, can distinguish an original record carrier from a copy. With the data comprised in the information file the user can securely access the predetermined area on the target server that is preferably an internet server, e.g. the bonus material on a content server of the disc label. Since the data is provided in an executable file or accessible to an executable file, i.e. as an or within an application, that can access an automatic client/server authentification system preferably in a secure manner to grant access to certain target servers, e.g. websites, or areas, it can be secured that no key-codes, URLs etc. can be shared with others, since an access is only possible with the original record carrier in the disc drive. Further, the user experience/convenience is very good, since no complicated interaction, such as the typing of long serial codes, is necessary, but the access can be easily initiated, e.g. by a mouse-click. Preferably, the application opens the standard Web browser of the user/computer with the address of the authentification server and transmits at least the project identifier. The security level is quite high, i.e. as high as the security level of the copy protection. Further, according to the present invention, said authentification server further verifies whether or not a changing parameter of the computer, in particular a randomly generated number and/or a computer system time transmitted from said computer, was not already previously used and initiates a connection of said computer with said predetermined area of said target server in case of a positive verification.

The application might be provided on the record carrier, and/or on a server, preferably downloadable, and/or on an access-software record carrier, i.e. so that a user can start the execution of the application on the computer. In case the application is provided on the record carrier itself, the information file might be a part of the application and/or the application consist of only the information file that is in this case executable.

The information file comprises the project identifier and/or the address of the authentification server. This information is included according to the used authentification system. E.g. in case only one authentification server exists, the address of the authentification server needs not to be included in the information file on the record carrier, since it can be hard coded in the application that e.g. can be downloaded from a server of the disc label. On the other hand, in case one authentification server exists for every different project, e.g. different CD content, no project identifier needs to be included in the information file, since the address of the respective authentification server alone indicates the predetermined area on the target server. In this case the target server, i.e. content server, and the authentification server might be one physical device that might include further target and/or authentification servers. Of course, in case different authentification servers exist that are designed for authentification of different projects, e.g. one for each disc label that handles all different discs of that label, the respective address of the authentification server and the project identifier have to be included in the information file.

According to the present invention preferably an autorun-information file is provided on said record carrier, which autorun-information file provides an automatic execution of a predetermined executable file after the record carrier is loaded in a reading device.

According to the present invention preferably an autostart file is provided on said record carrier, which autostart file gets automatically executed after the record carrier is placed and loaded in a reading device and which autostart file provides a link to start said application, or which autostart file is part of said application, or which autostart file is said information file.

According to the present invention preferably the application gets started from said record carrier, or from a server, preferably as a download, or via an access-software record carrier, preferably after an installation of the application on a hard disc of the computer.

According to the present invention, preferably said application verifies whether or not the record carrier is an original and performs said communication with said authentification server in case of a positive verification.

According to the present invention preferably said executable file transmits a changing parameter of the computer, in particular a randomly generated number and/or a computer system time to said authentification server.

According to the present invention, additionally or alternatively preferably said authentification server verifies whether or not the communication with said application and/or a transmission of said project identifier as a request for a connection between said computer and said predetermined area of said target server is posted from said application and initiates a connection of said computer with said predetermined area of said target server in case of a positive verification. This verification might be performed on basis of an encryption/decryption scheme used to secure the information that is communicated between the application and the authentification server or parts thereof.

According to the present invention, preferably after a positive verification a connection between said authentification server and said target server is set-up by said authentification server that connects to said target server to secure that the computer is connected to said predetermined area of said target server via said authentification server.

According to the present invention, in this case, preferably the authentification server generates a session identifier based on the positive verified values and transmits said session identifier to said target server via said connection between said authentification server and said target server, said connection between said computer on which said application is started and said predetermined area of said target server is set up by redirecting the connection between the computer and the authentification server to the target server or by forwarding data of the protected area to the computer, and said connection between said computer on which said application is started and said predetermined area of said target server is executed after the target server received a confirmation of a validity of the session identifier from the authentification server. The forwarding of data of the protected area to the computer might include that data needed to establish a connection between the computer and the target server is forwarded so that such a connection might be set-up from the computer side or that data that the computer user requests, e.g. contents of the target server, are forwarded, i.e. the computer only communicates with the authentification server that communicates with the target server.

According to the present invention the validity of the session identifier is preferably confirmed by the authentification server by positively determining whether or not the session identifier exists and/or whether or not the session identifier was already requested to be valid.

According to the present invention the target server preferably assigns a temporary session cookie to the computer so that the whole predetermined area of the target server can be accessed via said connection between said computer on which said application is started and said target server According to the present invention preferably said record carrier is copy protected by copy protecting the information file.

According to the present invention preferably said predetermined area on said target server comprises bonus material of the content that is included on the record carrier besides said executable file, e.g. a video to a song included on the record carrier.

According to the present invention preferably said information file is a part of said application or is an executable file of said application.

The computer program product according to the present invention comprises computer program means adapted to perform the method steps as set-out above or parts thereof when being executed on a computer, digital signal processor, or the like.

The computer readable storage means according to the present invention comprises a computer program product according to the present invention.

Figure 2:
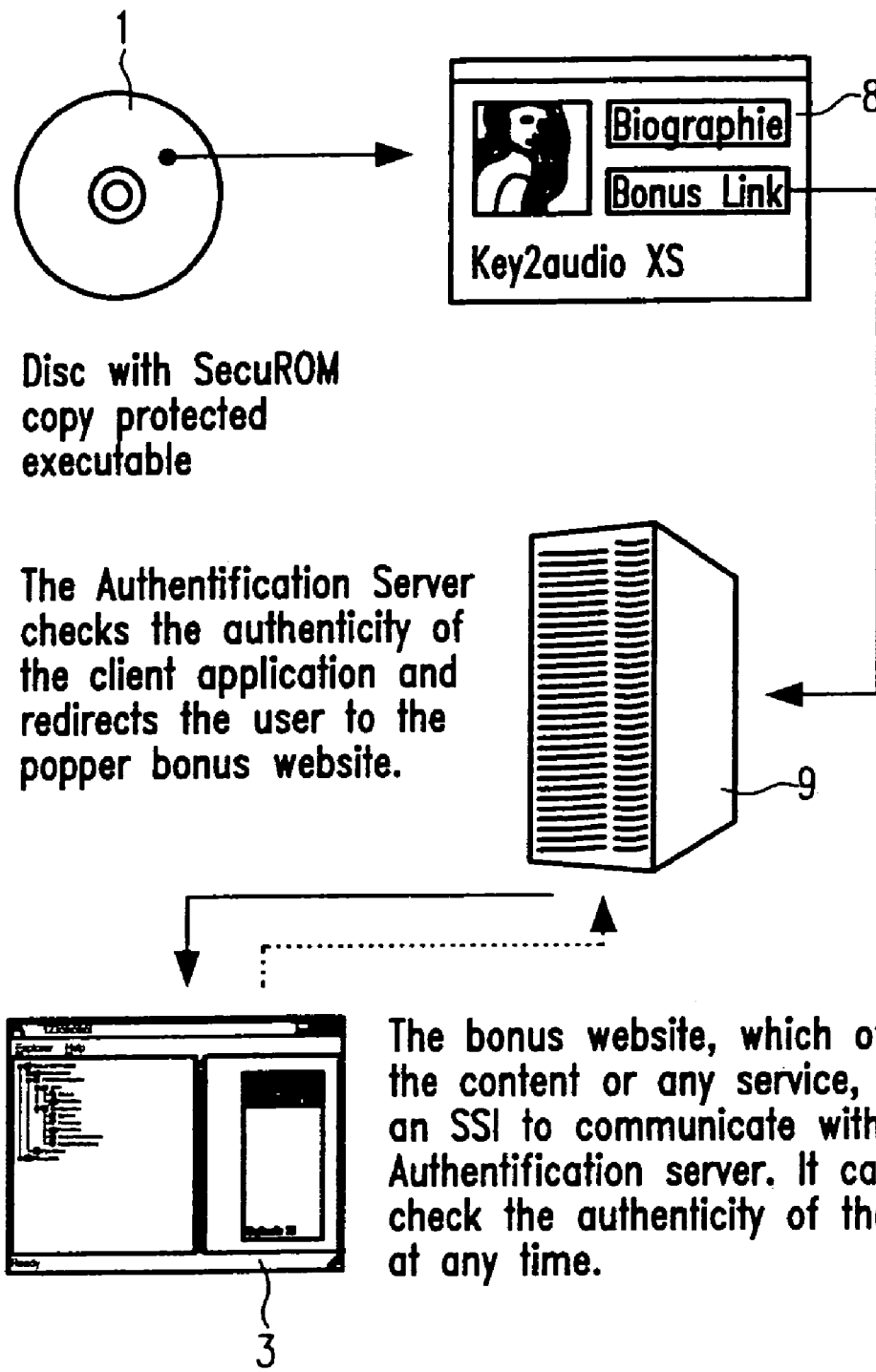
Figure 3:
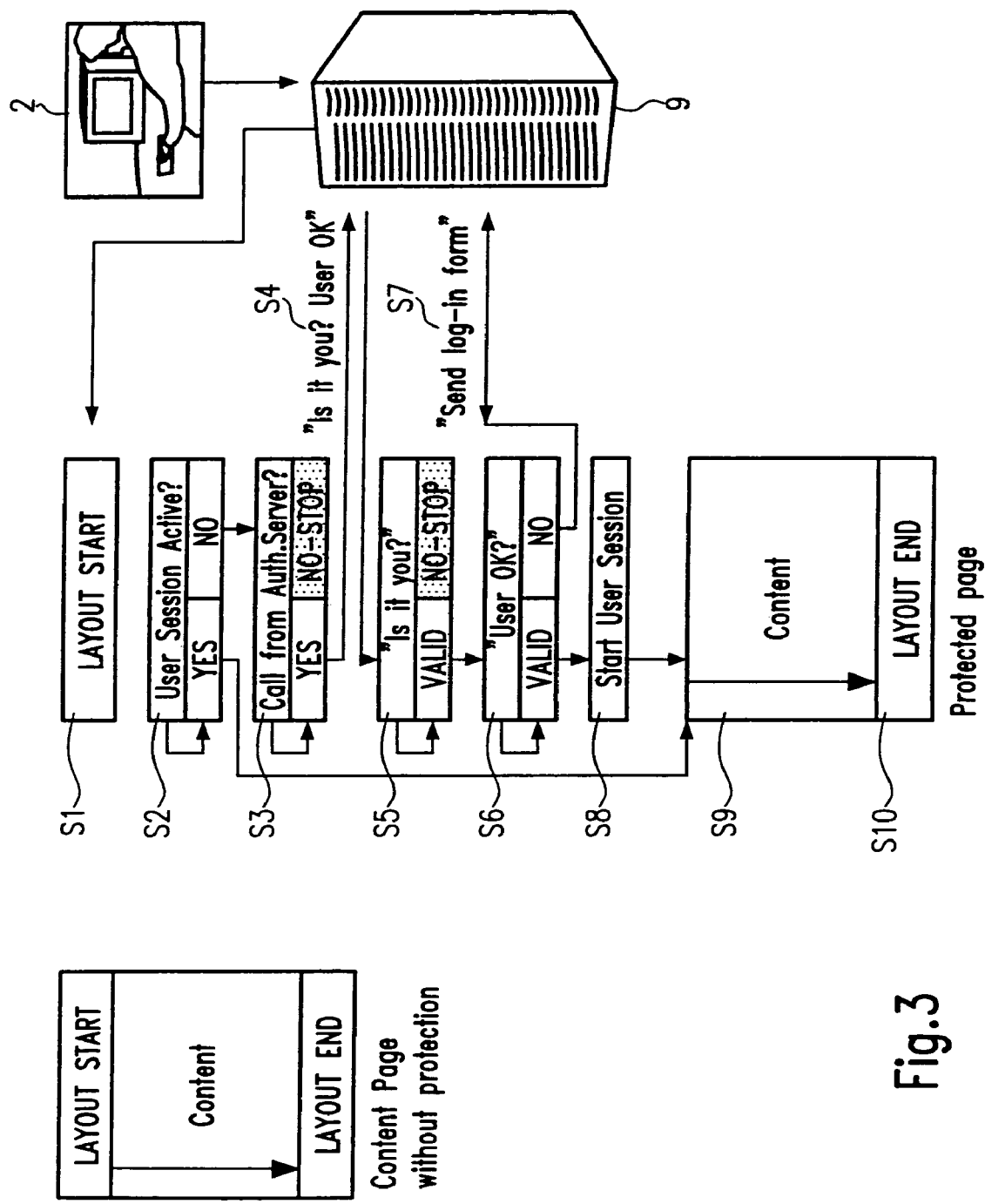

All different aspects of the present invention as set-out above and further elucidated below might be combined in any way. The accompanying drawings, which are incorporated in and constitute a part of this specification, illustrate an embodiment of the invention and, together with a general description of the invention given above, and the detailed description of the embodiment given below, serve to explain the principles of the invention, wherein:

FIG. 1 shows an embodiment of an environment to offer bonus material and added value according to the present invention, FIG. 2 shows a functionality description of the embodiment shown in FIG. 1, and FIG. 3 shows a flow chart of the authentification server and the target server according to an embodiment of the present invention.

The environment to offer bonus material and added value as shown in FIG. 1 allows to restrict the access to predetermined areas and services offered on a website to only owners of a particular, copy protected record carrier, e.g. CD 1. Copy CDs 7 of the original CD 1 will not provide the access, since the copy might not be accessible e.g. in case of a copy protection of the whole CD, or the executable file that provides the access according to the present invention which is provided on the original CD 1 is not copied due to a copy protection of this file, or original and duplicate are distinguishable due to their behaviour and the environment offers the bonus material only to originals, i.e. generally since the executable file or the whole CD 1 is copy protected. Therefore, only a buyer of the original CD 1 has access to bonus material, such as video streams, music downloads, games, price reductions in online shops, and so on.

Once the user has inserted the original CD 1 into a computer 2, an access of a portal 3 that offers the bonus material and/or the additional services is possible e.g. via the internet 4. The shown portal 3 offers an authentification 3a after which bonus material 3b, push services 3c, and mobile services 3d are available. Further, community services 3e, customer relationship 3f, and games/chat 3h are offered as well as an information window 3g. Via the portal 3 the verified user can access media rich content from an online digital production library 5 and can communicate via a MM-Message Service Centre 6 with a wireless network. The bonus material 3b, community services 3e, customer relationship 3f, and games/chat 3h might be internet services, the push services 3c might be directed to the internet, e.g. e-mail, or to mobile phones or smartphones, e.g. short message service. The mobile services 3d might be directed to mobile phones or smartphones.

The added value offered to the customer, i.e. the owner of the copy protected CD 1 according to the present invention, is protected intellectual property of the artists and publishers, e.g. music or video publishers, since tethered services are only available through the original record carrier. Further, the convenience and quality expected is provided which is a prerequisite to keep consumers away from p2p networks. Also, the tracking of user behaviour is possible so that one2one relationships, i.e. profiles, might be build up. The portal 3 might also serve as an extended platform for marketing activities and it bridges the gap between physical/electronic and mobile content delivery. The portal 3 might further show a build in DRM functionality for the major software players, such as the Real & Windows Media Player, which offers a convergence of media, e.g. CD/internet/mobile devices. An individual feedback according to a listing of preferences is possible and the community aspect might be satisfied by offering chats, games and downloads.

FIG. 2 shows an overview of the functionality of the environment shown in FIG. 1. The CD 1 comprises a SecuROM copy protected executable file, which secures that a user that executes the file is the legitimate owner of the CD 1. The executable file is the executable information file as set-out above, i.e. combines the executable file of the application and the information file. The executable file opens the standard browser 8 of the user with the address of the authentification server 9. At least a project identifier that corresponds to the predetermined area that comprises the bonus material etc. is also communicated to the authentification server 9, since in this case one authentification server handles several projects. Preferably, also a computer identifier is transmitted to the authentification server 9 to automatically identify a user.

The authentification server 9 verifies whether the request that is posted by addressing the authentification server 9 and communicating the project identifier is posted by the executable file and in case of a positive verification redirects the browser to the target address that corresponds to the target area so that the portal 3 of the target server or predetermined area of the target server is displayed. The authentification server 9 determines the target address from the project identifier. While redirecting the browser, the authentification server 9 communicates with the target server or predetermined area of the target server to secure that the user accesses the services via the authentification server 9.

The original record carrier, here the CD 1, might not only comprise the normal content, e.g. audio and/or video, and the executable file that provides the address of the authentification server and the project identifier, but also a file "autorun.inf" and a file "start.exe". The file autorun.inf secures an automatic loading of the file start.exe after the record carrier is placed and loaded in the drive and the file start.exe is an application that generates a preferably graphical user interface, which offers different possibilities of services related to the record carrier such as bibliography, games, etc. and a link to the executable file according to the present invention that provides the address of the authentification server and the project identifier, i.e. that initiates and executes the connection to the secured content.

In a preferred embodiment of the present invention said executable file generates a unique 8 byte computer identifier from the serial number and volume name of the hard disc "C", the checksum of the computer name, and the version of the operating system.

The executable file then opens the standard browser of the user and transmits e.g. the computer identifier, the project identifier and the system time to the authentification server 9 via the query string of the URL of the authentification server 9. This data is preferably key-coded. An example would be:

http://auth.sonydadc.com/
        auth.go?id=0B2C67B84A8B2C67B84A013FE2013FE2D6
        76E6 . . .

The project identifier is hard coded in the executable file, which means that a new executable file must be generated for every project, e.g. different CD. The authentification server 9 verifies and stores the data as follows:

decoding of the data string,
    verification whether the string was used already, if this is the case then denying the access,
    comparing the system time from the data string with the system times already previously obtained from the user (on basis of the computer identifier), if the new system time is bigger then granting the access, otherwise denying the access,
    generating of a 16 bit session identifier for this access, and
    redirecting the user to the target page, i.e. target area, of the target server, wherein the session identifier is communicated as query string.

The right hand side of FIG. 3 shows the communication between the authentification server 9 and the target server to access a secured web page as entry point of said predetermined area of the target server. As described above, in a first step S1 the user gets redirected after the positive authentification to the target server, e.g. a content server of the disc label, to the layout start of the protected page. With the redirecting also the session identifier generated by the authentification server 9 gets communicated to the target server via the query string. Therefore, such a redirecting could be:

http://www.shakira.com/
bonus.php?id=KS1757SKD6K9JGAWE . . .

After it is determined in a following second step S2 that no user session is active, the target server waits for a call from the authentification server 9 in a third step S3 and after the call the protected page directs a request to the authentification server 9 whether or not the session identifier is valid in a fourth step S4 in which the authentification server 9 also communicates a handshake protocol to the target server. The authentification server 9 determines for this verification whether or not the validity of the session identifier was requested earlier, i.e. whether or not the session identifier is still usable, and whether or not the session identifier exists at all. In case no call from the authentification server comes in the third step S3, the target server stops the access. The target server determines in a following fifth step S5 whether or not a communication with the authentification server is executed and in case of a valid authentification server 9 verifies whether or not the user might have access to the protected page in a sixth step S6. In case no valid authentification server communicates with the target server in the fifth step S5, the target server stops the access. In case it is determined in the sixth step S6 that the user might have access, the user session is started in an eighth step S8, otherwise a communication between target server and authentification server 9 is performed in a seventh step S7 to newly log-in the user.

After the user session is started in the eighth step S8 or it is determined in the second step S2 that a user session is already active, the access to the content is given in a following ninth step S9, so that the user might access the whole predetermined area without new authentification. Thereafter the layout of the protected page ends in a tenth step S10.

For comparison, the left hand side of FIG. 3 shows a normal page that has its content directly between the layout start and the layout end.

The executable file according to the present invention that provides the preferably automated access to the authentification server with at least the project identifier allows to easily modify the contents of a web server so that they are only accessible via the execution of the executable file.

To properly perform its functionality, the authentification server might comprise several tables in a database model. One table might store the core data of each project. Among other things, there are stored a project identifier, the hash of this project identifier and the URL where the browser should be linked or redirected to. A further table might store each request from the executable file according to the present invention so that a request can be verified, since no duplicates are allowed, and also for billing purposes. Among other things there are stored the project identifier, the computer identifier, an automatically created numeric counterpart of the computer identifier and an automatically created random session identifier string. Another table might be written from the target server side via an interface. This table protocols the accesses to the protected content, also within a session. The usage of this table is optional. It is necessary in case the number of accesses of one user/computer should be limited to a predetermined amount and no database should be provided on the target server side.

The invention claimed is:

1. A method for securing an access to a predetermined area of a target server, the method comprising:

providing an information file on a copy protected record carrier, the information file comprising a project identifier or an address of an authentication server with which an application using said information file can communicate;

said application is further configured to verify whether the record carrier is an original and to perform said communication with said authentication server in case of a positive verification and automatically initiating and confirming, by the authentication server using information contained in the record carrier, a connection between a computer on which said application is started and said predetermined area of said target server that is identified by the address of the authentication server or the project identifier; and verifying, by said authentication server, whether a changing parameter of the computer, which is a randomly generated number or a computer system time transmitted from said computer, was previously used, wherein said connection is initiated upon indication from said verifying step that the changing parameter was not previously used.

2. The method according to claim 1, comprising:

automatically executing, after the record carrier is loaded in a reading device, a predetermined executable file provided in an autorun-information file on said record carrier.

3. The method according to claim 1, comprising:

automatically executing an autostart file provided on said record carrier after the record carrier is placed and loaded in a reading device, the autostart file including i) a link to start said application, ii) an indication that the autostart file is a part of said application, or iii) an indication that the autostart file is said information file.

4. The method according to claim 1, comprising:

providing the application on said record carrier or on a server as a download, or on an access-software record carrier.

5. The method according to claim 1, wherein the information file comprises the project identifier and the address of the authentication server.

6. The method according to claim 1, wherein the changing parameter is a randomly generated number and a computer system time.

7. A method for starting a secure access to a predetermined area of a target server, the method comprising:

accessing an information file on a copy protected record carrier, the information file comprising a project identifier or an address of an authentication server with which an application using said information file can communicate;

said application is further configured to verify whether the record carrier is an original and to perform said communication with said authentication server in case of a positive verification and automatically initiating and confirming, by the authentication server using information contained in the record carrier, a connection between a computer on which said application is started and said predetermined area of said target server that is identified by the authentication server or the project identifier and verifying, by said authentication server, whether a changing parameter of the computer, which is a randomly generated number or a computer system time transmitted from said computer, was previously used, wherein said connection is initiated upon indication from said verifying step that the changing parameter was not previously used.

8. The method according to claim 7, comprising:

starting the application from said record carrier or from a server as a download, or via an access-software record carrier after an installation of the application on a hard disc of the computer.

9. The method according to claim 7, further comprising:

verifying, by said application, whether the record carrier is an original; and performing said communication with said authentication server in case of a positive verification by the step of verifying, by said application.

10. The method according to claim 7, further comprising:

transmitting, by said application, the changing parameter of the computer to said authentication server.

11. The method according to claim 7, further comprising:

verifying, by said authentication server, whether the communication with said application or a transmission of said project identifier as a request for a connection between said computer and said predetermined area of said target server is posted from said application, wherein said connection is initiated upon indication from said verifying step that the communication or the transmission of said project identifier is posted.

12. The method according to claim 7, further comprising:

establishing a connection, upon indication from said verifying step that the changing parameter was not previously used, between said authentication server and said target server to connect the computer to said predetermined area of said target server via said authentication server.

13. The method according to claim 12, further comprising the steps of:

generating, by said authentication server, a session identifier based on a result of said verifying step;

transmitting said session identifier to said target server via said connection between said authentication server and said target server;

redirecting the connection between the computer and the authentication server to the target server or forwarding data of the protected area to the computer to set up said connection between said computer on which said application is started and said predetermined area of said target server; and executing said connection between said computer, on which said application is started, and said predetermined area of said target server after the target server receives a confirmation of a validity of the session identifier from the authentication server.

14. The method according to claim 13, further comprising:

confirming, by the authentication server, validity of the session identifier by positively determining whether the session identifier exists or whether a request on the validity of the session identifier was already made.

15. The method according to claim 13, further comprising:

assigning, by the target server, a temporary session cookie to the computer to enable access of the whole predetermined area of the target server via said connection between said computer on which said application is started and said target server.

16. The method according to claim 7, further comprising: copy protecting the information file by protecting the copy of said record carrier.

17. The method according to claim 7, wherein said predetermined area on said target server comprises bonus material.

18. The method according to claim 7, wherein said information file is a part of said application or is an executable file of said application.

19. The method according to claim 7, wherein the information file comprises the project identifier and the address of the authentication server.

20. The method according to claim 7, wherein the changing parameter is a randomly generated number and a computer system time.

21. A computer readable storage medium having computer executable instructions causing a computer, or a digital signal processor to perform steps comprising:

providing an information file on a copy protected record carrier, the information file comprising a project identifier or an address of an authentication server with which an application using said information file can communicate;

said application is further configured to verify whether the record carrier is an original and to perform said communication with said authentication server in case of a positive verification and automatically initiating and confirming, by the authentication server using information contained in the record carrier, a connection between a computer on which said application is started and said predetermined area of said target server that is identified by the address of the authentication server or the project identifier; and verifying, by said authentication server, whether a changing parameter of the computer, which is a randomly generated number or a computer system time transmitted from said computer, was previously used, wherein said connection is initiated upon indication from said verifying step that the changing parameter was not previously used.

22. The method according to claim 21, wherein the information file comprises the project identifier and the address of the authentication server.

23. The method according to claim 21, wherein the changing parameter is a randomly generated number and a computer system time.

24. A copy protected storage record carrier, comprising:

an application and an information file, the information file comprising a project identifier or an address of an authentication server with which the application using said information file can communicate;

said application is further configured to verify whether the record carrier is an original and to perform said communication with said authentication server in case of a positive verification;

said authentication server is configured to use the information file and automatically initiate and confirm a connection between a computer on which an application file is started and a predetermined area of a target server that is identified by the address of the authentication server or the project identifier; and said application is configured to transmit a changing parameter of the computer including a randomly generated number or a computer system time, to said authentication server; wherein said authentication server is configured to verify whether the changing parameter of the computer was previously used, and initiate said connection upon verification that the changing parameter was not previously used.

25. The record carrier according to claim 24, wherein said record carrier is copy protected by protecting the copy of the information file.

26. The record carrier according to claim 24, further comprising:
an autorun-information file configured to automatically execute a predetermined executable file after the record carrier is loaded in a reading device.

27. The record carrier according to claim 24, further comprising:
an autostart file, which is automatically executed after the record carrier is placed and loaded in a reading device, the autostart file including i) a link to start said application, ii) an indication that the autostart file is part of said application, or iii) an indication that the autostart file is said information file.

28. The record carrier according to claim 24, wherein said information file is a part of said application or is an executable file of said application.

29. The record carrier according to claim 24, wherein said predetermined area on said target server comprises bonus material.

30. The method according to claim 24, wherein the information file comprises the project identifier and the address of the authentication server.

31. The method according to claim 24, wherein the changing parameter is a randomly generated number and a computer system time.

* * * * *